United States Patent [19]

Haisma et al.

[11] Patent Number: 4,948,029

[45] Date of Patent: Aug. 14, 1990

[54] METHOD OF BONDING TWO BODIES

[75] Inventors: Jan Haisma; Andries R. Miedema, both of Eindhoven, Netherlands

[73] Assignee: U.S. Philips Corporation, New York, N.Y.

[21] Appl. No.: 368,442

[22] Filed: Jun. 19, 1989

[30] Foreign Application Priority Data

Jun. 28, 1988 [NL] Netherlands .......................... 8801638

[51] Int. Cl.$^5$ .......................... B23K 1/20; B23K 20/12; B23K 20/24; B23K 20/16
[52] U.S. Cl. ..................................... 228/112; 228/114; 228/116; 228/193; 228/238; 148/403
[58] Field of Search ............... 228/115, 116, 193, 238, 228/263.11, 112, 114; 148/403

[56] References Cited

U.S. PATENT DOCUMENTS

| | | | |
|---|---|---|---|
| 4,196,837 | 4/1980 | Burkart et al. | 228/116 |
| 4,247,034 | 1/1981 | Burkart et al. | 228/116 |
| 4,452,389 | 6/1984 | Amin | 228/193 |
| 4,564,396 | 1/1986 | Johnson et al. | 148/127 |
| 4,568,014 | 2/1986 | Madsen | 228/116 |
| 4,640,816 | 2/1987 | Atzmon et al. | 29/599 |
| 4,810,318 | 3/1989 | Haisma et al. | 156/153 |

FOREIGN PATENT DOCUMENTS

| | | | |
|---|---|---|---|
| 1219 | 4/1979 | European Pat. Off. | 228/116 |
| 219465 | 9/1986 | Japan | 228/116 |
| 327023 | 3/1972 | U.S.S.R. | 228/116 |

Primary Examiner—Richard K. Seidel
Assistant Examiner—Samuel M. Heinrich
Attorney, Agent, or Firm—Norman N. Spain

[57] ABSTRACT

Two bodies are provided with mutually different metal layers. The combination of wringing in contact of the metal surfaces and low-temperature interdiffusion provides a strong bond between the two bodies.

5 Claims, No Drawings

METHOD OF BONDING TWO BODIES

BACKGROUND OF THE INVENTION

The invention relates to a method of bonding two bodies, in which both bodies are provided with a thin layer, whereafter these two thin layers are both activated by a slight polishing operation and are thereafter bonded together by a mechanical wringing in contact operation.

Such a method is disclosed in the European patent application EP 137537. In the method described there glass optical components, for example, are provided with thin dichroic layers, such as oxides, sulphides or fluorides, which layers are thereafter subjected to a fresh-polishing operation. This slight polishing operation activates the surface, as a result of which, after the slight polishing surfaces have been brought into contact with each other these surfaces are wrung into contact. Van der Waals-bonds are then formed between these two surfaces.

A disadvantage of the prior art method is that the adhesive force between the two surfaces is too weak for some types of applications. The Van der Waals-bonds are relatively weak and produce an adhesive force of approximately 10 N/cm$^2$. It was found that this adhesive force can be improved by firing the combination after the wringing contact operation at a temperature of 900°–1000° C. This is however objectionable for many applications.

SUMMARY OF THE INVENTION

The invention has inter alia for its object to provide a method of the type defined in the opening paragraph, in which the adhesive force is significantly increased and a temperature treatment of not more than 480° C. is necessary.

According to the invention, this object is accomplished by a method of the type described in the opening paragraph, which method is further characterized in that the thin layers are metal layers consisting of mutually different metals, the layers being subjected after the wringing in contact operation to an elevated temperature treatment and the metals forming an amorphous alloy. Metals which can be combined into an amorphous alloy at a relatively low temperature have a negative mixing heat (that is to say heat is released). The relevant metal atoms are of highly different sizes, so that the small metal atoms diffuse into the lattice of the large metal atoms. In cases in which there are such mobile atoms an amorphous alloy can easily deform, so that stresses which may occur on bonding two materials of highly different coefficients of expansion can be compensated for. The bond is effected by having the two layers, one of which contains the immobile (large) metal atom and the other layer the mobile (small) metal atom brought into contact. The effective surface of contact, produced by Van der Waals-forces, is sufficient to have the diffusion occur at a relatively low temperature the mixture indeed results in a decrease in the free energy. The materials of the bodies to be bonded may be insulators, conductors or semiconductors. Depending on the material of the bodies to be bonded, the thin metal layers can be applied in a customary manner, for example by means of vapor deposition or sputtering, either by galvanizing or by electroless deposition. Prior to bonding, the surfaces of the two bodies are flattened and smoothed by means of a bulk-decreasing polishing operation (mirror polishing). In such a polishing operation at least 10 μm of material is removed. Slight polishing of the deposited thin metal layers is, for example, done using a suspension of SiO$_2$ particles (diameter for example 30 nm) in a NaOH solution (pH between 10 and 11).

The polishing is effected by means of both chemical and mechanical action of the polishing suspension. Substantially no material is then removed, but the surface is indeed bond activated. After the surfaces to be bonded have been thoroughly cleaned, the wringing in contact operation is effected at ambient temperature in atmospheric conditions. The subsequent temperature treatment is also effected in atmospheric conditions. This method provides an adhesive force of at least 3500 N/cm$^2$.

DETAILED DESCRIPTION OF THE INVENTION

An embodiment of the method according to the invention, is characterized in that one metal is chosen from the group formed by group IV B (Ti, Zr and Hf) of the Periodic System and the other metal is chosen from the group formed by the transition metals from the groups V B, VI B, VII B, VIII and I B, more specifically the transition metals from the 3d-series. An amorphous alloy can be obtained from two metals when the atomic volumes of the metal atoms have highly different sizes, the smallest atom diffusing into the matrix of the large atoms. Such a difference was found to occur when the ratio of the atomic volumes of the two metals is approximately 2 or more. A practical example is the combination Zr-Cr, in which Zr (an element from group IV B) has an atomic volume of 14.0 cm$^3$/mole and Cr (an element from group VI B) has an atomic volume of 7.3 cm$^3$/mole. The ratio of the atomic volumes then is 1.9.

A further embodiment of the method according to the invention, is characterized in that one metal is a rare earth metal and the other metal a transition metal. The rare earth metals are characterized by large atomic volumes, in contradistinction to the atomic volumes of the transition metals. A practical example is the combination La-Au, in which La has an atomic volume of 22.5 cm$^3$/mole and Au has an atomic volume of 10.2 cm$^3$/mole. The ratio of the atomic volumes then amounts to 2.2. For some metals which have an insufficient adhesion to the substrate chosen it may be necessary to provide a thin adhesive layer between the substrate and the metal layer. A Cr-layer of not more than 20 nm thick is very suitable for that purpose.

An embodiment of the method according to the invention, is characterized in that metal layers having a thickness of approximately 50 nm are applied. This thickness is sufficient to enable formation of the amorphous alloy and to effect the bond. During the subsequent slight polishing operation the thickness is decreased by approximately 10 nm.

An embodiment of the method according to the invention, is characterized in that the temperature treatment is effected at a temperature of not more than 480° C. The temperature treatment must be effected below the crystallisation temperature of the alloy formed. The formation of intermetallic compounds must be prevented because of their brittle character. Often an amorphous alloy will already by formed at a temperature of 100° C. Such a method can be used with advantage for bonding silicon wafers provided with integrated circuits, to a different substrate. Integrated circuits of this type do not tolerate temperature higher than approximately 480° C. because of the aluminum conductors they contain.

The invention will now be described in greater detail by way of example, with reference to the following embodiments.

EMBODIMENT 1

Two quartz glass substrates having a diameter of 30 mm and a thickness of 3 mm are flattened and smoothened by means of a bulk-reducing polishing operation. Approximately 10 μm of material is removed. After the substrates have been cleaned and dried in a customary manner, a 50 nm thick zirconium layer is sputtered onto a substrate. A 50 nm thick chromium layer is sputtered onto the other substrate. Thereafter both metal layers are subjected to a slight polishing operation in which Syton polishing agent is used. Syton is a trade name of Monsanto and contains a suspension of $SiO_2$ particles having, for example, an average diameter of 30 nm in a NaOH solution. In this slight polishing step approximately 10 nm is removed from the metal layer. Thereafter the surfaces to be bonded are etched as follows:

10 minutes in an ultrasonic bath of 1,1,1-trichloroethane 10 minutes in an ultrasonic bath of "super quality" water "Super quality" water is also known as Electronic Grade Ultra Pure Water (class E-I) in a proposed ASTM-standard. Special characteristics of this water are inter alia an electrical resistance >18 MΩcm; maximum 2 particles >1 μm per ml; a metal ion concentration <1 ppb and a maximum of 1 micro-organism per ml.

15 minutes in a mixture of 3 parts by volume of 96% $H_2SO_4$ and 1 part by volume of 30% $H_2O_2$ at 100° C.

10 minutes in a mixture of 1 part by volume of 25% ammonia and 1 part by volume of 30% $H_2O_2$ at 48° C.

1 minute in 1% HF 15 minutes in 100% $HNO_3$ 15 minutes in 65% $HNO_3$ at 70° C.

Between these steps the surfaces are rinsed in "super quality" water. Thereafter the cleaned surfaces are softpolished for 1.5 minute with only "super quality" water as the medium. Finally the surface areas are spin-dried.

The two polished surfaces are brought in contact as rapidly as possible, that is to say bonded by means of Van der Waals-forces. This bond is intensified by interdiffusion of the two metals by means of a temperature treatment at 380° C. in air for half an hour. After cooling the adhesive force between the quartz glass substrates is determined. For this purpose two metal ends are cemented in the centers of both non-metallized surfaces of the substrate, in such manner that the centerlines of the pins coincide. A two-component epoxy glue known to have a tensile strength of 3500 $N/cm^2$ is used as the glue. The substrates with the pins are clamped in a tensile strength tester and thereafter subjected to a tensile load. It was found that rupture occurred in the glue layer, which means that the adhesive force between the two metal layers exceeds 3500 $N/cm^2$.

EMBODIMENT 2

Embodiment 1 is repeated, but now one substrate is provided with a 50 nm thick lanthanum layer and the other substrate with a 50 nm thick gold layer. Also in this case it was found that in the tensile strength test rupture occurred in the glue layer, for which it follows that the adhesive force between the two metal layers exceeds 3500 $N/cm^2$.

COMPARISON EXAMPLE

Embodiment 1 is repeated, but now the wringing in contact operation is not followed by a temperature treatment at 380° C. In the tensile strength test separation of the two metal layers at the interface occurred at a value of approximately 10 $N/cm^2$.

We claim:

1. A method of bonding together two bodies, said method comprising:
    (a) applying a thin metallic layer of two different metals on opposing surfaces of said bodies, each metallic layer being formed of a different metal, the atomic volume ratio of said metals being approximately 1.9 or more, and said two metals being capable of forming an amorphous alloy,
    (b) slightly polishing said thin metallic layer to activate the surfaces of said thin metallic layer,
    (c) wringing in contact with the resultant actuated surfaces of said thin metallic layers and holding said thin metallic layers, while in contact with each other, to a temperature sufficient to cause the metals containing metallic layers to form an amorphous alloy.

2. A method as claimed in claim 1, characterized in that one metal is chosen from the group consisting of group IV B (Ti, Zr and Hf) and the other metal is selected from the group consisting of the transition metals from the group V B, VI B, VII B, VIII and I B of the Periodic System.

3. A method as claimed in claim 1, characterized in that one metal is a rare-earth metal and the other metal is a transition metal.

4. A method as claimed in claim 1, characterized in that metal layers having a thickness of approximately 50 nm are applied.

5. A method as claimed in claim 1, characterized in that the temperature treatment is effected at a temperature of not more than 480° C.

* * * * *